(12) United States Patent
Hart et al.

(10) Patent No.: US 9,140,327 B2
(45) Date of Patent: Sep. 22, 2015

(54) END MEMBER ASSEMBLIES AND GAS SPRING ASSEMBLIES INCLUDING SAME

(71) Applicant: Firestone Industrial Products Company, LLC, Indianapolis, IN (US)

(72) Inventors: Corey S. Hart, McCordsville, IN (US); Stephen C. Street, Carmel, IN (US); Paul P. Koeske, Fishers, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/015,274

(22) Filed: Aug. 30, 2013

(65) Prior Publication Data

US 2014/0061984 A1    Mar. 6, 2014

Related U.S. Application Data

(60) Provisional application No. 61/695,633, filed on Aug. 31, 2012.

(51) Int. Cl.
*F16F 9/05* (2006.01)
*B60G 11/27* (2006.01)
*B60G 17/052* (2006.01)
*B60G 11/28* (2006.01)

(52) U.S. Cl.
CPC . *F16F 9/05* (2013.01); *B60G 11/27* (2013.01); *B60G 11/28* (2013.01); *B60G 17/0521* (2013.01); *F16F 9/052* (2013.01); *F16F 9/057* (2013.01); *B60G 2202/152* (2013.01); *B60G 2204/126* (2013.01); *B60G 2204/4502* (2013.01); *B60G 2206/424* (2013.01)

(58) Field of Classification Search
CPC .... B60G 11/27; B60G 2202/152; F16F 9/057
USPC .............................. 267/122, 124, 64.23, 64.27
See application file for complete search history.

(56) References Cited

U.S. PATENT DOCUMENTS

| | | | | |
|---|---|---|---|---|
| 5,535,994 | A * | 7/1996 | Safreed, Jr. | 267/64.27 |
| 6,234,460 | B1 * | 5/2001 | Arnold | 267/35 |
| 7,328,887 | B2 * | 2/2008 | Leonard | 267/122 |
| 8,141,854 | B2 * | 3/2012 | Levy et al. | 267/64.27 |
| 8,613,430 | B2 * | 12/2013 | Leonard | 267/64.19 |
| 2006/0226586 | A1 * | 10/2006 | Levy | 267/64.27 |
| 2008/0211150 | A1 * | 9/2008 | Levy et al. | 267/64.27 |
| 2008/0246198 | A1 * | 10/2008 | Levy et al. | 267/124 |
| 2010/0252970 | A1 * | 10/2010 | Leonard | 267/64.21 |
| 2012/0153550 | A1 * | 6/2012 | Sigirtmac et al. | 267/64.27 |
| 2013/0056917 | A1 * | 3/2013 | Buttner | 267/64.27 |
| 2014/0091548 | A1 * | 4/2014 | Ratz et al. | 280/124.157 |
| 2014/0246818 | A1 * | 9/2014 | Smith | 267/64.27 |

\* cited by examiner

*Primary Examiner* — Thomas Irvin
(74) *Attorney, Agent, or Firm* — Jason A. Houser; Fay Sharpe LLP (57) ABSTRACT

An end member assembly includes an end member body and an end member insert. The end member body can include an outer side wall, an inner side wall disposed radially inward relative to the outer side wall, and a bottom wall that together with the inner side wall at least partially define a cavity. The end member insert can be supported on the end member body and selectively rotatable relative thereto. A gas spring assembly and a suspension system are also included.

20 Claims, 5 Drawing Sheets

END MEMBER ASSEMBLIES AND GAS SPRING ASSEMBLIES INCLUDING SAME

This application claims priority from U.S. Provisional Patent Application No. 61/695,633 filed on Aug. 31, 2012, which is hereby incorporated herein by reference in its entirety.

BACKGROUND

The subject matter of the present disclosure broadly relates to the art of gas spring devices and, more particularly, to end member assemblies having rotatable components for use in forming gas spring assemblies with end members that can be repositioned relative to one another. Additionally, suspension systems can include one or more of such gas spring assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

It is common for the suspension system of vehicles to be adapted and/or otherwise arranged such that there are few operating conditions, during normal usage, under which the plurality of spring devices would be tensioned or otherwise undergo a tension load. Nonetheless, conventional gas spring assemblies are often secured on or along associated structural components using threaded fasteners and other similar securement devices that pass through patterns of holes or openings in the associated structural component to secure the end members of a gas spring assembly thereon. In this manner, the end members of the gas spring assembly can be fixedly secured to the associated structural component.

Gas spring assemblies are known to be constructed in a variety of configurations and arrangements, such as those having convoluted bellows and those having rolling-lobe sleeves. Typically, a gas spring assembly will also include opposing end members that are fixedly secured to a flexible wall (e.g., a convoluted bellows or an elongated flexible sleeve) such that a substantially fluid-tight spring chamber is formed within the gas spring assembly. In such cases, the end members are normally rotationally fixed relative to one another. Therefore, the desired positioning or alignment of any features or components on the opposing end members is normally be established by the manufacturer during assembly.

In some cases, a given size, type and/or construction of gas spring assembly may be used in applications that have different mounting conditions. In such cases, multiple variations of the gas spring assembly are designed, manufactured and sometimes inventoried to meet the demand for these different variations of the gas spring assembly. In many cases, however, such variations may have substantially identical components that are simply positioned in different orientations relative to one another. This can lead to inefficiencies as well as increased costs and/or inventory levels where a variety of mounting configurations of a given model of gas spring assembly are requested and/or used.

As such, it is believed desirable to develop gas spring assemblies having end members that are capable of being rotationally realigned to address the foregoing and/or other disadvantages of known constructions or to otherwise advance the art of gas spring devices.

BRIEF SUMMARY

One example of an end member assembly in accordance with the subject matter of the present disclosure can be dimensioned for securement to an associated flexible wall for forming an associated gas spring assembly. The end member assembly can include an end member body and an end member insert. The end member body can be formed from a polymeric material and can have a longitudinal axis. The end member body can extend longitudinally between opposing first and second ends. The end member body can include an outer side wall extending in a generally longitudinal direction and an inner side wall disposed radially inward relative to the outer side wall. The end member body can also include a bottom wall that extends transverse to the longitudinal axis and together with the inner side wall at least partially defines a cavity accessible from along the first end. The end member insert can be formed from a polymeric material and can be supported along the first end of the end member body such that at least a portion of the end member insert is disposed within the cavity. The end member insert can include a flange wall extending transverse to the longitudinal axis and a first side wall extending from along the flange wall in a direction opposite the end member body. The end member insert can also include a second side wall extending from along the flange wall in a direction opposite the first side wall. The end member insert can also include a bottom wall extending transverse to the longitudinal axis and being operatively connected to the second side wall. The first side wall can have an outer surface dimensioned to receive an end of the associated flexible wall such that a substantially fluid-tight seal can be formed along the first side wall.

One example of a gas spring assembly in accordance with the subject matter of the present disclosure can include a flexible wall having a longitudinal axis and extending peripherally about the longitudinal axis between a first end an a second end to at least partially define a spring chamber. An end member can be secured across the first end of the flexible wall and an end member assembly can be secured across the second end of the flexible wall. The end member assembly can include an end member body formed from a polymeric material and having a longitudinal axis. The end member body can extend longitudinally between opposing first and second ends. The end member body can include an outer side wall extending in a generally longitudinal direction and an inner side wall disposed radially inward relative to the outer side wall. A bottom wall can extend transverse to the longitudinal axis and together with the inner side wall can at least partially define a cavity accessible from along the first end. An end member insert can be formed from a polymeric material and can be supported along the first end of the end member body such that at least a portion of the end member insert is disposed within the cavity thereof. The end member insert can include a flange wall extending transverse to the longitudinal axis and a first side wall extending from the flange wall in a direction opposite the end member body. A second side wall can extend from along the flange wall in a direction opposite the first side wall. A bottom wall can extend transverse to the longitudinal axis and can be operatively connected to the second side wall. The first side wall can include an outer surface dimensioned to receivingly engage the second end of the flexible wall such that a substantially fluid-tight seal can be formed therewith along the first side wall. The end member insert can be selectively rotatable relative to the end member body such that in an assembled condition of the gas spring assembly the end member body can be rotatably re-positioned relative to the end member.

One example of a suspension system in accordance with the subject matter of the present disclosure can include a pressurized gas system including a pressurized gas source and a control device in fluid communication with the pressurized gas source. At least one gas spring assembly in accordance with the foregoing paragraph can be disposed in fluid communication with the pressurized gas source through the control device.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
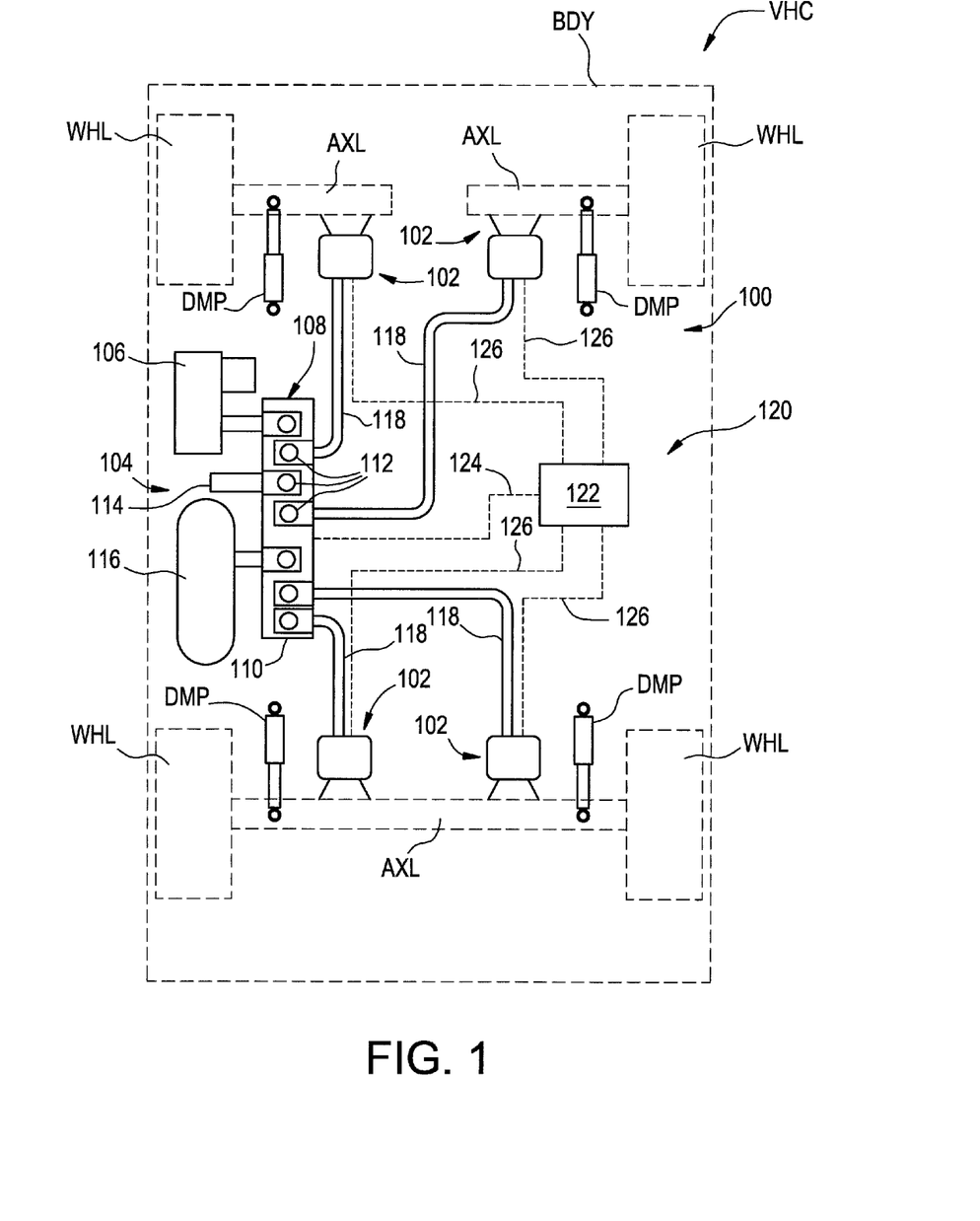
FIG. 1 is a schematic representation of one example of a suspension system of an associated vehicle including a gas spring assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will be appreciated that such a suspension system of the vehicle can also, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

One example of a gas spring assembly 200 in accordance with the subject matter of the present disclosure is shown in FIGS. 2-5 as having a longitudinally-extending axis AX (FIG. 3) and can include one or more end members, such as an end member 202 and an end member 204 (which may also be referred to herein as an end member assembly) that is spaced longitudinally from end member 202. A flexible wall 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIGS. 2 and 3, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member assembly 204 can be secured along a second or lower structural component LSC, such as an axle AXL in FIG. 1, for example, in any suitable manner. As one example, lower structural component LSC could include one or more mounting holes HLS extending therethrough. In such case, a threaded fastener 216 could extend through one of mounting holes HLS and threadably engage end member 204 to secure the end member on or along the lower structural component.

It will be appreciated that the one or more end members can be of any suitable type, kind, construction and/or configuration, and can be operatively connected or otherwise secured to the flexible wall in any suitable manner. In the exemplary arrangement shown in FIGS. 2 and 3, for example, end member 202 is of a type commonly referred to as a bead plate and is secured to a first end 218 of flexible wall 206 using a crimped-edge connection 220. End member assembly 204 is shown in the exemplary arrangement in FIGS. 2 and 3 as being of a type commonly referred to as a piston (or a roll-off piston) that has an outer surface 222 that abuttingly engages flexible wall 206 such that a rolling lobe 224 is formed therealong. As gas spring assembly 200 is displaced between extended and collapsed conditions, rolling lobe 224 is displaced along outer surface 222 in a conventional manner.

Figure 3:
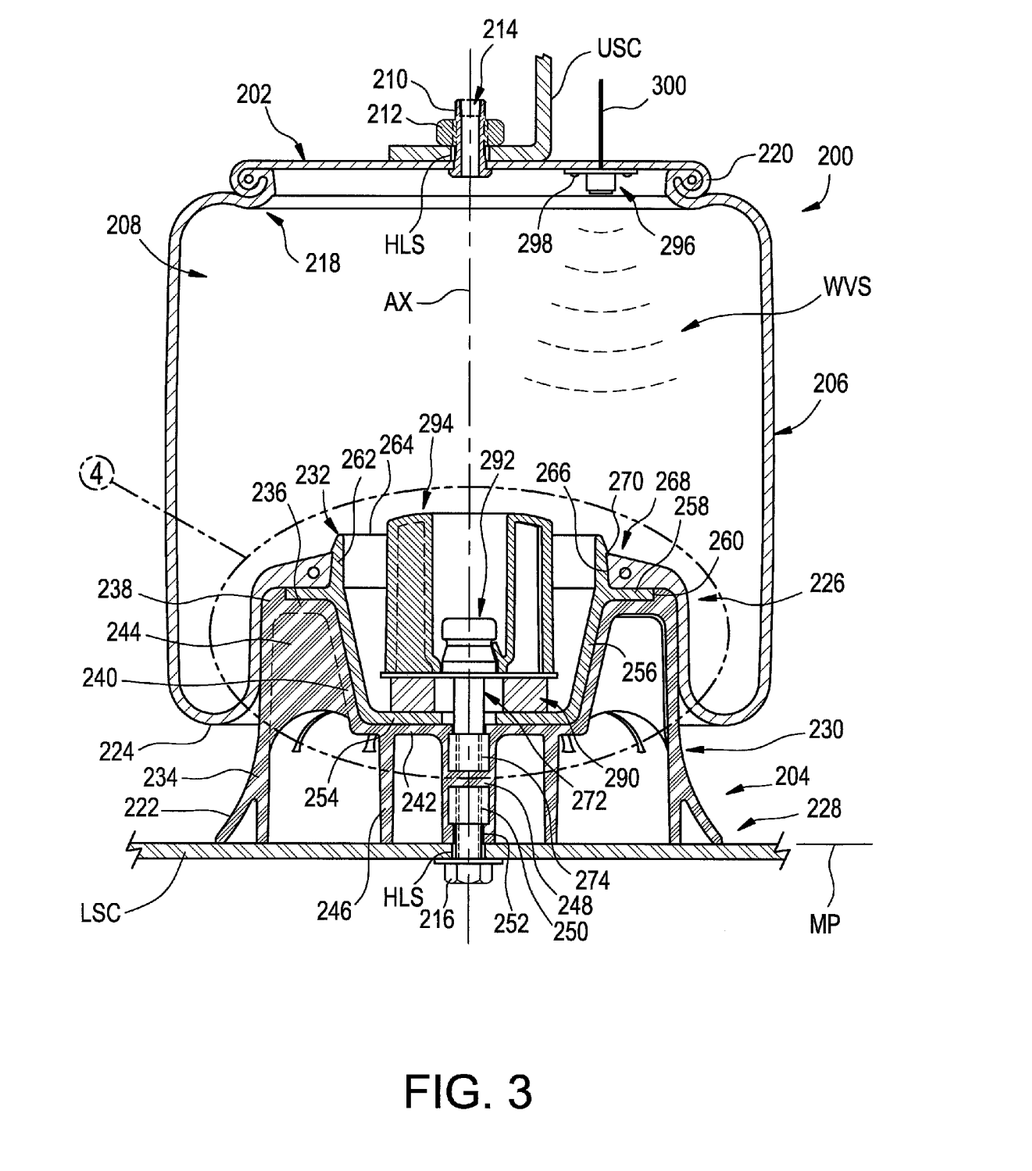
FIG. 3 is a cross-sectional side view of the gas spring assembly in FIG. 2 taken from along line 3-3 in FIG. 2.
Figure 4:
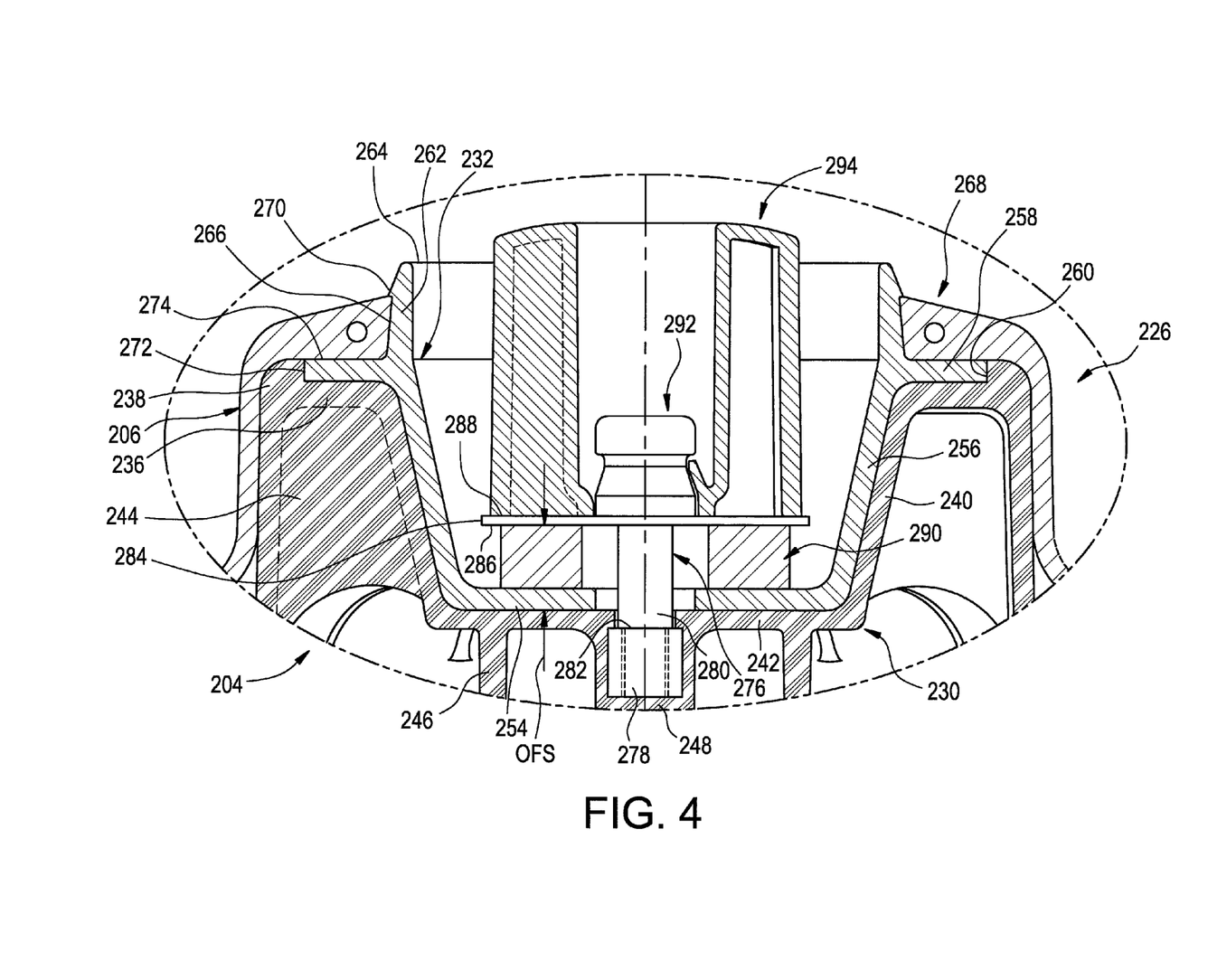
FIG. 4 is a greatly enlarged view of the portion of the gas spring assembly identified as Detail 4 in FIG. 3.
Figure 5:
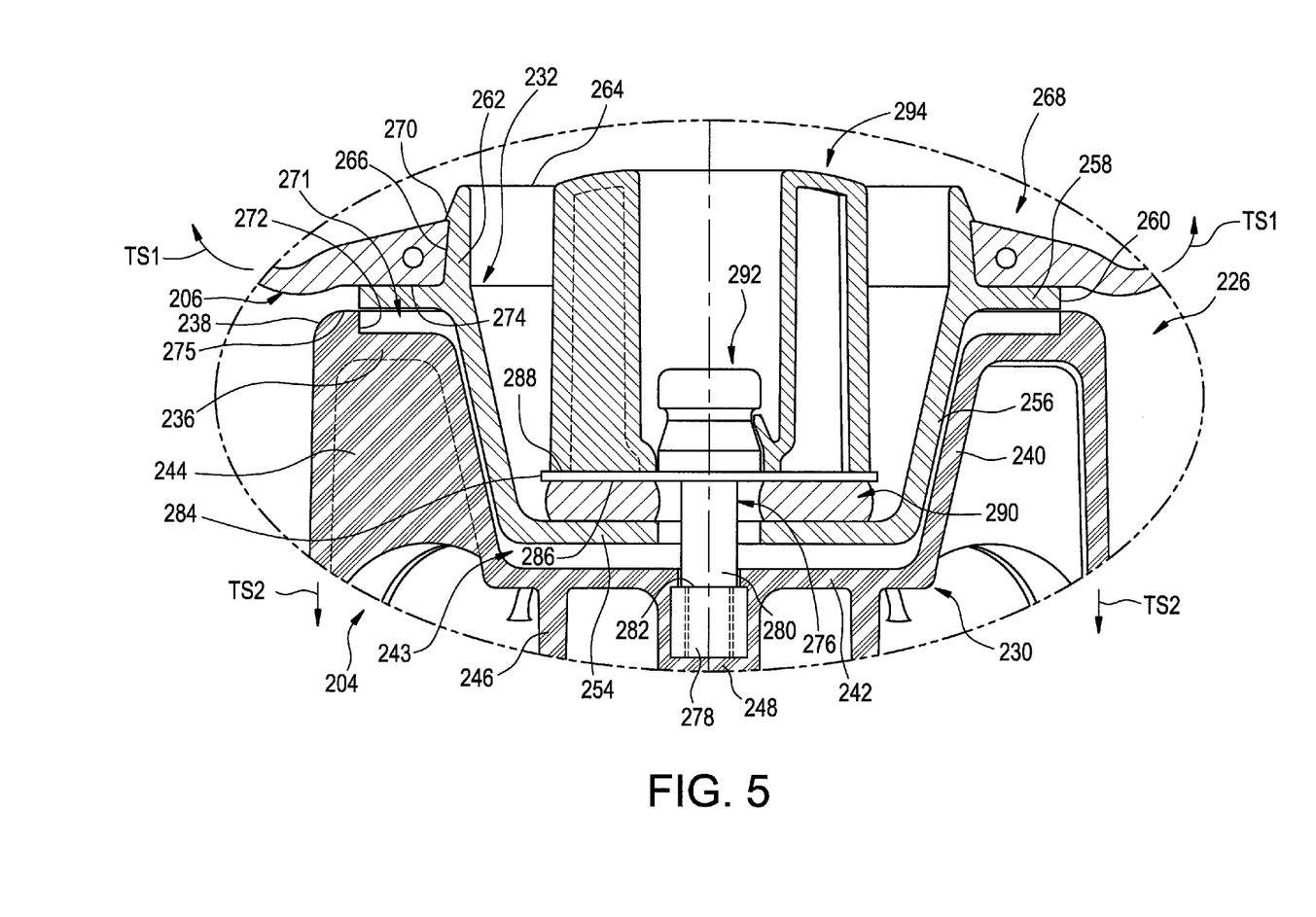
FIG. 5 shows the portion of the gas spring assembly in FIG. 4 in a disengaged and rotatable condition.

As identified in FIGS. 3-5, end member assembly 204 extends from along a first or upper end 226 toward a second or lower end 228 that is spaced longitudinally from end 226. End member assembly 204 includes an end member body 230 and an end member insert 232 that is supported on the end member body. Body 230 includes a longitudinally-extending outer side wall 234 that extends peripherally about axis AX and at least partially defines outer surface 222. An end wall 236 is disposed transverse to axis AX and extends radially-inwardly from along a shoulder portion 238, which is disposed along the outer side wall toward end 226. Body 230 also includes an inner side wall 240 that extends longitudinally-inwardly into the body from along end wall 236. Inner side wall 240 terminates at a bottom wall 242 that is approximately planar and disposed transverse to axis AX such that inner side wall 240 and bottom wall 242 at least partially define a cavity 243 (FIG. 5) within body 230. In some cases, bridge walls 244 can, optionally, extend between and operatively interconnect outer side wall 234 and inner side wall 240.

An inner support wall 246 is disposed radially-inwardly from outer side wall 234 and extends peripherally about axis AX. In some cases, inner support wall 246 can form a hollow, column-like structure that projects from along bottom wall 242 in a longitudinal direction toward end 228. In some cases, the distal end of outer side wall 234 and/or the distal end of inner support wall 246 can at least partially define a mounting plane MP formed along end 228 of the end member body. In this manner, body 230 can be supported at least in part by outer side wall 234 and/or inner support wall 246, such as on or along an associated structural member (e.g., lower structural component LSC in FIGS. 2 and 3). In some cases, axially applied loads or forces transmitted to bottom wall 242, such as from impacts imparted on a jounce bumper, for example, can be reacted, communicated or otherwise at least partially transferred to the associated mounting structure by the inner support wall.

Body 230 can also include a central wall 248 that is disposed radially-inwardly from inner support wall 246 and forms a post-like structure that projects from along bottom wall 242 in a direction toward end 228. In some cases, central wall 248 can terminate in approximate alignment with mounting plane MP, such as is illustrated in FIG. 3, for example. End member assembly 204 can optionally include one or more features or components suitable for use in securing the end member on or along an associated structural component. As one example, a threaded insert 250 can be molded into or otherwise captured and retained within central wall 248 and can be dimensioned to receive a suitable threaded fastener (e.g., threaded fastener 216) for securement of the end member on or along the associate structural component (e.g., lower structural component LSC). In some cases, a longitudinally-extending passage 252 can extend into central wall 248 from along mounting plane MP such that the threaded fastener can reach and engage insert 250 or another suitable feature.

End member insert 232 is shown in FIGS. 3-5 as being at least partially received within cavity 243 formed within end member body 230 by inner side wall 240 and bottom wall 242. End member insert 232 can include a bottom or end wall 254 that is oriented generally transverse to axis AX and, in some cases, can be disposed in approximate alignment with bottom wall 242. A side wall 256 can extend from along end wall 254 in a direction toward end 226 of the end member assembly. In some cases, a flange wall 258 can extend radially outwardly from along side wall 256 toward an outermost peripheral edge 260. Additionally, a side wall 262 can extend axially from along side wall 256 and/or flange wall 258 in a generally axial direction toward a distal edge 264. Side wall 262 can include an outer surface 266 that is dimensioned to receive a second end 268 of flexible wall 206 such that a substantially fluid-tight seal can be formed therebetween. In some cases, a retaining ridge 270 can project radially-outwardly from along side wall 262 and can extend peripherally along at least a portion thereof.

As indicated above, end member insert 232 is at least partially received within cavity 243 formed by inner side wall 240 and bottom wall 242 within end member body 230. In some cases, the end member body can include a recess or bore 271 that is at least partially defined by end wall 236 and an outer peripheral edge wall 272. In this manner, an outer surface 274 of flange wall 258 can be disposed in approximate alignment with an end wall portion 275 and/or shoulder portion 238 of the end member body such that a substantially planar or otherwise substantially non-offset transition can be formed therebetween. Additionally, in a preferred embodiment, end member insert 232 with be secured or otherwise retained in operative association with end member body 230 in a manner suitable for permitting relative rotation between the end member insert and the end member body. In this manner, end member insert 232 can be substantially fixedly attached to flexible wall 206 while permitting end member body 230 and end member insert 232 to remain rotatable relative to one another. In this manner, one or more features of end member body 232 can be re-oriented or otherwise aligned with one or more other features of end member 202 without twisting or otherwise introducing an angular distortion of flexible wall 206.

It will be appreciated that end member insert 232 can be operatively connected or otherwise rotatably secured on or along end member body 230 in any suitable manner. As one example, a retaining element 276 can be operatively connected on or along end member body 230 in a suitable manner, such as, for example, by threadably engaging a threaded insert 278, which can be molded into or otherwise captured and retained within central wall 248 or another portion of end member body 230. As identified in FIGS. 4 and 5, retaining element 276 can include a threaded end (not shown) dimensioned to threadably engage threaded insert 278. Additionally, a post 280 can extend from the threaded end and at least partially form a shoulder 282 that can be positioned to abuttingly engage bottom wall 242 and/or threaded insert 278. In this manner, retaining element 276 can be secured on or along end member body 230.

In some cases, retaining element 276 can include a washer or flange wall 284 that extends radially-outward from along post 280 and has opposing surfaces 286 and 288. It will be appreciated that surface 286 will be offset or otherwise positioned a predetermined distance from bottom wall 254 of end member insert 232 when retaining element 276 is seated in abutting engagement with threaded insert 278, such as is represented by reference dimension OFS in FIG. 4, for example. In some cases, an engaging element 290 can, optionally, be operatively disposed between surface 286 and bottom wall 254. In some cases, engaging element 290 can take the form of a biasing element, such as a compression spring or an elastomeric bushing, to urge and maintain end member insert 232 in abutting engagement with end member body 230. In other cases, engaging element 290 can take the form of a rotatable bearing, such as may be suitable for facilitating rotation of the end member insert relative to the end member body. In still other cases, the engaging element can provide a combination of the foregoing and/or other functions.

End member assembly 204 is shown in FIG. 4 in an engaged condition in which end member body 230 and end member insert 232 are disposed in abutting engagement with one another. Additionally, it will be recognized that in such an engaged condition, flexible wall 206 is disposed in abutting engagement with at least a portion of end member body 230, such as along wall portions 234, 238 and 275, for example. In such condition, rotation of end member insert relative to end member body can, in some cases, be substantially inhibited, such as may be due to the frictional engagement of one or more wall portions of end member body 230 and end member insert 232, frictional engagement of flexible wall 206 with one or more portions of end member body 230, a rotation inhibiting condition of engaging element 290 or any combination of such conditions.

End member 204 is illustrated in FIG. 5 in a disengaged condition in which end member insert 232 is disposed in spaced relation to end member body 230. It will be appreciated that such a condition can be achieved in any suitable manner, such as by applying tension to the gas spring assembly, such as is represented in FIG. 5 by arrows TS1 applied to flexible wall 206 and arrows TS2 applied to end member body 230, for example. In such case, the flexible wall is drawn away from frictional engagement with end member body 230, which can, in some cases, permit relative rotation between end member body 230 and end member insert 232. Additionally, or in the alternative, frictional disengagement between one or more wall or wall portions of end member body 230 and end member insert 232 with one another can, in some cases, permit relative rotation between the end member body and the end member insert.

Additionally, or as a further alternative, engaging element 290, which is shown in a deflected or dis-engaged condition in FIG. 5, can be operatively disposed between end member insert 232 and one or more of end member body 230 and/or retaining element 276. In some cases, the engagement element can include a bearing element that can be operative to provide a reduced-friction interface between the end member insert and one of the end member body and the retaining element. Additionally, or in the alternative, the engagement element can include a biasing element operative to bias the end member insert in an axial direction, such as into engagement with the end member body, for example. Furthermore, or as a further alternative, the engagement element can include a rotation-limiting element operative to selectively permit rotation of the end member insert relative to the end member body. It will be appreciated that such a rotation-limiting element could be actuated in any suitable manner, such as, for example, upon axial displacement of the end member insert relative to the end member body. It will be appreciated that all of such functionality can be achieved with the gas spring assembly in an assembled condition.

In a preferred arrangement, end member body 230 and end member insert 232 of end member assembly 204 can be formed from a polymeric material by way of an injection molding or other process that permits the end member body and/or the end member insert to be formed as a unitary body. It will be appreciated that the components of end member assembly 204 (e.g., end member body 230 and end member insert 232) can be formed from any suitable material or combination of materials. For example, the components of end member assembly 204 (e.g., end member body 230 and end member insert 232) can be formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

In some cases, retaining element 276 can, optionally, include a bumper mount 292 that is disposed along surface 288 and projects outwardly therefrom in an axial direction toward end 226 of the end member assembly. Gas spring assembly 200 can also, optionally, include a jounce bumper 294 that can be supported within spring chamber 208, such as to inhibit direct contact between end members 202 and 204, for example. It will be appreciated that the jounce bumper, if included, can be supported on or along an end member in any suitable manner. For example, jounce bumper 294 is shown as being received on and retained by bumper mount 292. Additionally, it will be appreciated that the jounce bumper can be of any suitable form, configuration and/or construction, and can be formed from any suitable material or combination of materials. For example, jounce bumper 276 can be formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

Figure 2:
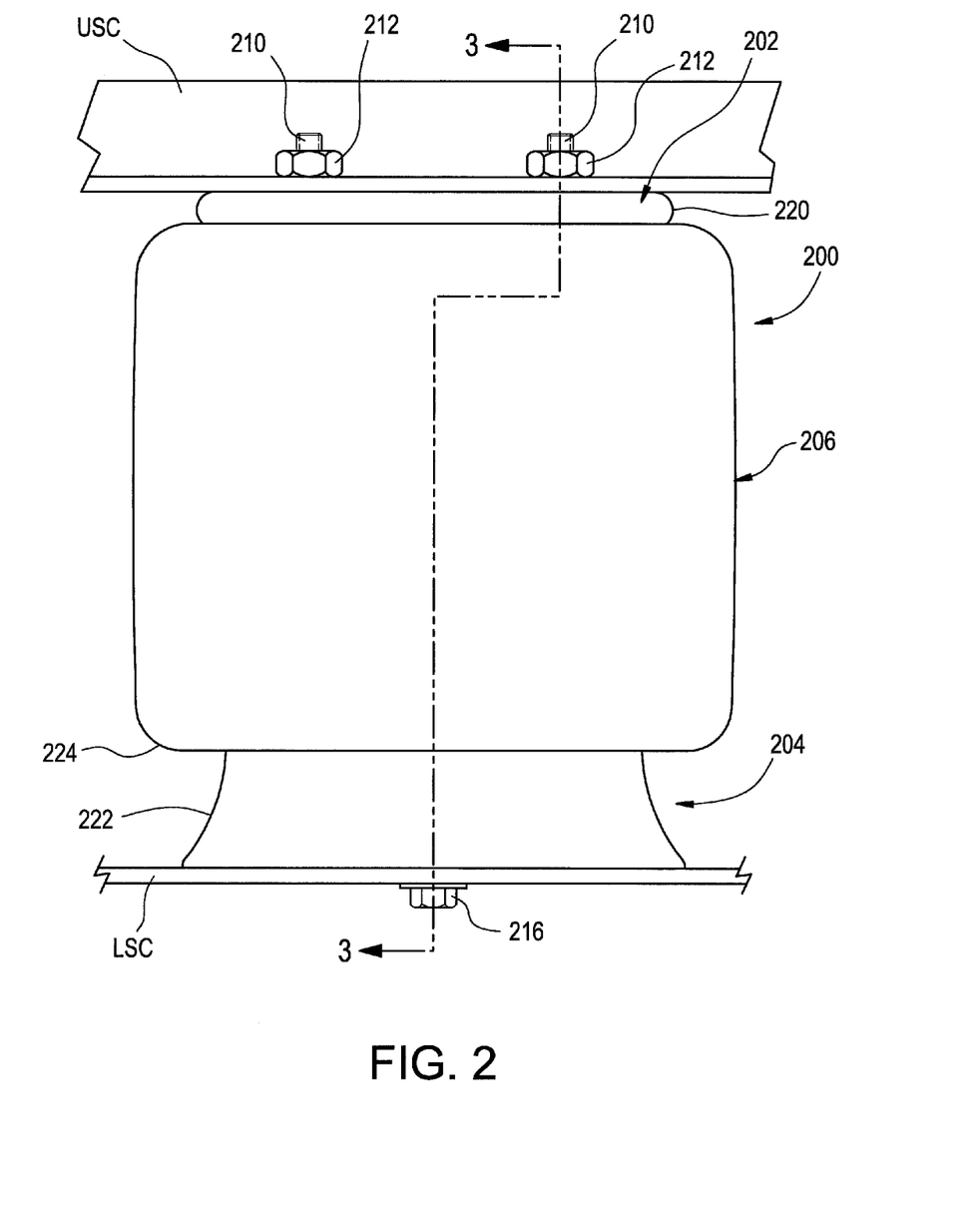
FIG. 2 is a side elevation view of one example of a gas spring assembly that includes one example of an end member assembly in accordance with the subject matter of the present disclosure.

A height or distance sensing device 296 is, optionally, shown in FIG. 3 as being disposed within spring chamber 208 along end member 202 and being secured thereto using suitable fasteners 298. Height sensing device 296 can be of any suitable type, kind and/or construction, such as an ultrasonic sensor that transmits and receives ultrasonic waves WVS (FIG. 3), for example. Additionally, it will be appreciated that height sensing device 296 can be connected to other systems and/or components of a vehicle suspension system in any suitable manner. As shown in FIG. 2, height sensing device 296 includes a lead or connection 300 that can be used for such communication purposes, such as is indicated by leads 126 of control system 120 in FIG. 1, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly dimensioned for securement to an associated flexible wall for forming an associated gas spring assembly, said end member comprising:
    an end member body formed from a polymeric material and having a longitudinal axis, said end member body extending longitudinally between opposing first and second ends, said end member body including;
    an outer side wall extending in a generally longitudinal direction;
    an inner side wall disposed radially inward relative to said outer side wall;
    an end wall portion disposed along said first end of said end member body, said end wall portion extending transverse to said longitudinal axis and including an end wall surface; and,
    a bottom wall extending transverse to said longitudinal axis in offset relation to said end wall portion such that said bottom wall together with said inner side wall at least partially defines a cavity within said end member body accessible from along said first end; and, an end member insert formed from a polymeric material and supported along said first end of said end member body, said end member insert including:
- a flange wall extending transverse to said longitudinal axis and including a first surface and a second surface facing opposite said first surface;
- a first side wall extending from along said first surface of said flange wall in a direction opposite said end member body, said first side wall having an outer surface that together with said first surface of said flange wall forms a mounting seat dimensioned to receive an associated end of the associated flexible wall such that a substantially fluid-tight seal can be formed along at least one of said outer surface of said first side wall and said first surface of said flange wall;
- a second side wall extending from along said second surface of said flange wall in a direction opposite said first side wall; and,
- a bottom wall extending transverse to said longitudinal axis in offset relation to said flange wall and being operatively connected to said second side wall;

said end member insert oriented on said end member body such that at least a portion of said end member insert is disposed within said cavity and said first surface of said flange wall of said end member insert is disposed in a substantially common plane with said end wall surface of said end wall portion of said end member body.

2. An end member assembly according to claim 1, wherein said end member insert is axially displaceable between an engaged condition in which said end member insert is disposed in abutting engagement with said end member body and a disengaged condition in which said end member insert is disposed in spaced relation to said end member body.

3. An end member assembly according to claim 2, wherein in said engaged condition said end member insert is substantially inhibited from rotation relative to said end member body and in said disengaged condition said end member insert is rotatable relative to said end member body.

4. An end member assembly according to claim 1, further comprising a retaining element secured to said end member body along said first end thereof, said retaining element including a retaining wall disposed in spaced relation to said bottom wall of said end member body such that said bottom wall of said end member insert is disposed therebetween.

5. An end member assembly according to claim 4, wherein said retaining element includes a bumper mount projecting from said retaining wall in a direction opposite said bottom wall of said end member body.

6. An end member assembly according to claim 4, wherein said retaining element includes a post extending between said end member body and said retaining wall, said end member insert including an opening extending through said bottom wall thereof dimensioned to receive said post.

7. An end member assembly according to claim 4, further comprising an engaging element disposed between said retaining wall and said bottom wall of said end member insert.

8. An end member assembly according to claim 7, wherein said engaging element includes a bearing element operative to provide a reduced-friction interface between said end member insert and one of said end member body and said retaining element.

9. An end member assembly according to claim 7, wherein said engaging element includes a rotation-limiting element operative to selectively permit rotation of said end member insert relative to said end member body upon axial displacement of said end member insert relative to said end member body.

10. An end member assembly according to claim 4, wherein said end member body includes an insert at least partially embedded within a portion thereof, and said retaining element operatively engages said insert for securement to said end member body.

11. An end member assembly according to claim 10, wherein said end member body includes a central wall projecting from bottom wall toward said second end of said end member body, and said insert is at least partially embedded within at least one of said bottom wall and said central wall of said end member body.

12. An end member assembly according to claim 1, wherein said end member body includes a mounting plane disposed along said second end and dimensioned for engagement of said end member body with an associated structural component.

13. An end member assembly according to claim 1, wherein said end member body includes a recess extending into said end member body from along said first end, and said flange wall of said end member insert is dimensioned for receipt within said recess.

14. An end member assembly dimensioned for securement to an associated flexible wall for forming an associated gas spring assembly, said end member comprising:
- an end member body formed from a polymeric material and having a longitudinal axis, said end member body extending longitudinally between opposing first and second ends, said end member body including an outer side wall extending in a generally longitudinal direction, an inner side wall disposed radially inward relative to said outer side wall and a bottom wall extending transverse to said longitudinal axis and together with said inner side wall at least partially defining a cavity accessible from along said first end;
- an end member insert formed from a polymeric material, said end member insert supported along said first end of said end member body such that at least a portion of said end member insert is disposed within said cavity, said end member insert including a flange wall extending transverse to said longitudinal axis, a first side wall extending from said flange wall in a direction opposite said end member body, a second side wall extending from along said flange wall in a direction opposite said first side wall, a bottom wall extending transverse to said longitudinal axis and being operatively connected to said second side wall, said first side wall having an outer surface dimensioned to receive an end of the associated flexible wall such that a substantially fluid-tight seal can be formed along said first side wall;
- a retaining element secured to said end member body along said first end thereof, said retaining element including a retaining wall disposed in spaced relation to said bottom wall of said end member body such that said bottom wall of said end member insert is disposed therebetween; and,
- an engaging element disposed between said retaining wall and said bottom wall of said end member insert, said engaging element includes a biasing element operative to bias said end member insert in an axial direction.

15. A gas spring assembly comprising:
- a flexible wall having a longitudinal axis and extending peripherally about said longitudinal axis between a first end and a second end to at least partially define a spring chamber;
- an end member secured across said first end of said flexible wall; and, an end member assembly secured across said second end of said flexible wall, said end member assembly including:
an end member body formed from a polymeric material and having a longitudinal axis, said end member body extending longitudinally between opposing first and second ends, said end member body including:
an outer side wall extending in a generally longitudinal direction;
an inner side wall disposed radially inward relative to said outer side wall;
an end wall portion disposed along said first end of said end member body, said end wall portion extending transverse to said longitudinal axis and including an end wall surface; and,
a bottom wall extending transverse to said longitudinal axis in offset relation to said end wall portion such that said bottom wall together with said inner side wall at least partially define a cavity within said end member body accessible from along said first end; and,
an end member insert formed from a polymeric material and supported along said first end of said end member body, said end member insert including:
a flange wall extending transverse to said longitudinal axis and including a first surface and a second surface facing opposite said first surface;
a first side wall extending from along said first surface of said flange wall in a direction opposite said end member body, said first side wall having an outer surface that together with said first surface of said flange wall forms a mounting seat dimensioned to receive said second end of said flexible wall such that a substantially fluid-tight seal is formed thereby along at least one of said outer surface of said first side wall and said first surface of said flange wall;
a second side wall extending from along said second surface of said flange wall in a direction opposite said first side wall; and,
a bottom wall extending transverse to said longitudinal axis in offset relation to said flange wall and being operatively connected to said second side wall;
said end member insert oriented on said end member body such that at least a portion of said end member insert is disposed within said cavity and said first surface of said flange wall of said end member insert is disposed in a substantially common plane with said end wall surface of said end wall portion of said end member body.

16. A gas spring assembly according to claim 15, wherein said end member insert is axially displaceable between an engaged condition in which said end member insert is disposed in abutting engagement with said end member body and a disengaged condition in which said end member insert is disposed in spaced relation to said end member body such that said end member insert is selectively rotatable relative to said end member body whereby in an assembled condition of said gas spring assembly said end member body can be rotatably re-positioned relative to said end member.

17. A gas spring assembly according to claim 16, wherein in said engaged condition said end member insert is substantially inhibited from rotation relative to said end member body and in said disengaged condition said end member insert is rotatable relative to said end member body.

18. A gas spring assembly according to claim 17, wherein in said engaged condition said flexible wall is disposed in abutting engagement with at least a portion of said end member body and in said disengaged condition said flexible wall is disposed in spaced relation to said end member body.

19. A gas spring assembly according to claim 16, wherein said end member assembly includes:
a retaining element secured to said end member body along said first end thereof, said retaining element including a retaining wall disposed in spaced relation to said bottom wall of said end member body such that said bottom wall of said end member insert is disposed therebetween; and,
an engaging element disposed between said retaining wall and said bottom wall of said end member insert, said engagement element including at least one of:
a bearing element operative to provide a reduced-friction interface between said end member insert and one of said end member body and said retaining element;
a biasing element operative to bias said end member insert in an axial direction; and,
a rotation-limiting element operative to selectively permit rotation of said end member insert relative to said end member body upon axial displacement of said end member insert relative to said end member body.

20. A suspension system comprising:
at least one gas spring assembly according to claim 15; and,
a pressurized gas system operative to selectively transfer pressurized gas into and out of said at least one gas spring assembly.

* * * * *